Patented May 6, 1941

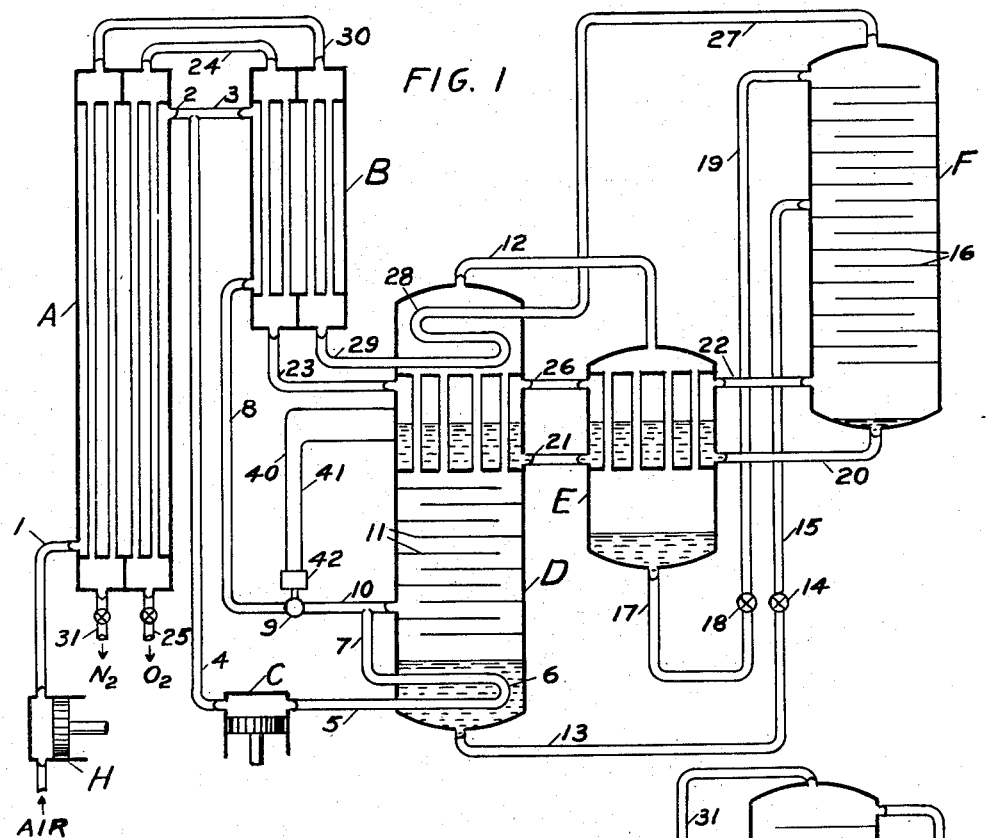
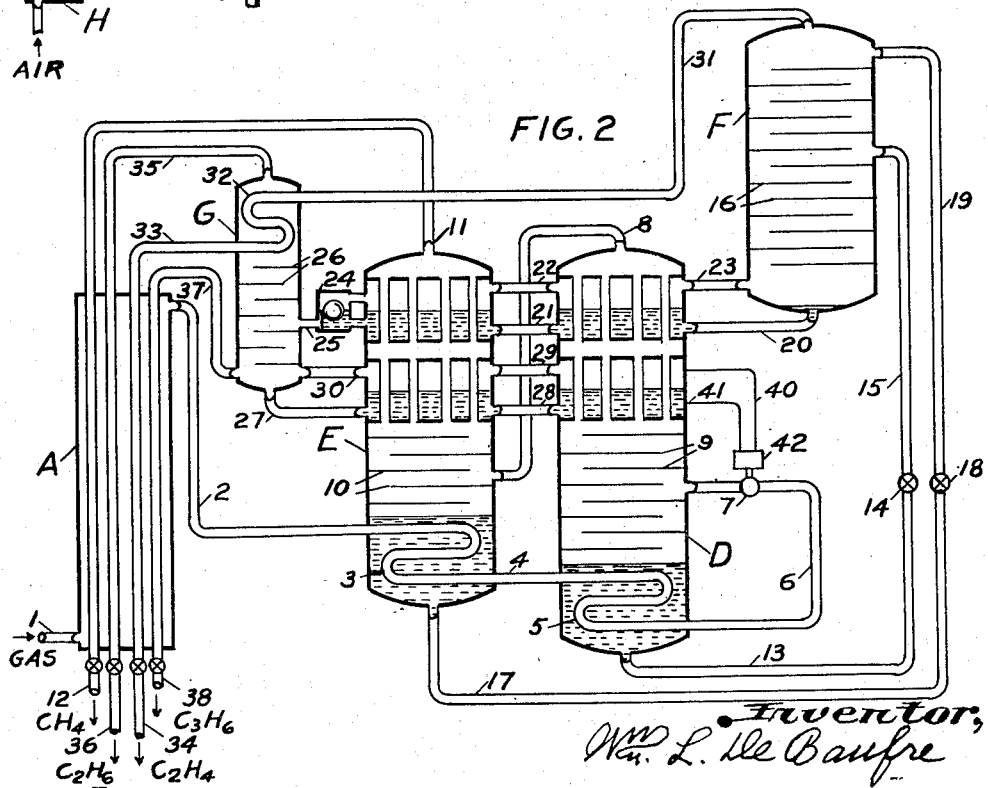

2,240,925

UNITED STATES PATENT OFFICE 2,240,925

RECTIFICATION OF GASEOUS MIXTURES

William Lane De Baufre, Lincoln, Nebr.

Application November 2, 1936, Serial No. 108,913

16 Claims. (Cl. 62—122)

This invention relates to separation of gaseous mixtures by rectification below atmospheric temperature and is particularly applicable to those processes wherein the gaseous mixture is subjected to a preliminary and a final rectification.

An object of the invention is to improve the effectiveness of the rectification and thus increase the purity or the recovery or both purity and recovery of a final product of rectification.

Another object of the invention is to separate one of the products of the final rectification into more nearly pure constituents of the gaseous mixture.

A further object of the invention is to automatically keep operating conditions constant and maintain the refrigeration supplied in balance with the refrigeration required to keep the apparatus at normal operating temperatures.

These objects and such other advantages as may hereinafter appear or are incident to the invention, are realized by the method and apparatus shown in preferred form on the accompanying drawing. Figure 1 shows the invention applied in the separation of atmospheric air whereby more nearly pure oxygen or nitrogen is obtained and the recovery of the other product of the final rectification thereby increased. Figure 2 shows the invention applied in the separation of a gaseous mixture of hydrocarbons whereby an additional separation of the constituents of the gaseous mixture is effected.

In this invention, the more volatile product of the final rectification is utilized to augment the reflux liquids in either the preliminary rectification or the final rectification or both. In Fig. 1, the reflux liquid in the preliminary rectification is augmented by heat exchange directly between the vapor product of the preliminary rectification and the more volatile product of the final rectification. In Fig. 2 the reflux liquids in both the preliminary and the final rectifications are augmented indirectly by a double heat exchange having the less volatile product of the final rectification intermediate to the vapor product of the preliminary rectification and the more volatile product of the final rectification. In Fig. 2, in addition to increasing the effectiveness of rectification, the less volatile product of the final rectification is subjected to an auxiliary rectification whereby it is further separated into more nearly pure gaseous constituents.

While in Fig. 1 the invention is shown as applied to the separation of oxygen and nitrogen from atmospheric air and in Fig. 2 it is shown as applied to the separation of hydrocarbons, either process may be applied to the separation of the other gaseous mixture. For example, the process of Fig. 2 may be applied to the separation of argon and oxygen in the less volatile product of the final rectification of atmospheric air. These two figures illustrate both the expansion engine method and the throttling method of producing the refrigeration necessary to cool the apparatus to operating temperatures and to automatically maintain its operation below atmospheric temperature.

The apparatus shown in Fig. 1 comprises:

Compressor H for compressing atmospheric air.

Interchanger A for cooling the compressed air below atmospheric temperature by heat exchange with returning products of rectification, nearly pure oxygen and nitrogen.

Liquefier B for further cooling and more or less liquefying one portion of the compressed air by heat exchange with returning products of rectification.

Expansion engine C for expanding another portion of the compressed air with performance of external work whereby heat is removed from the air expanded.

Preliminary rectifier D for separating the expanded and partly liquefied air into a nearly pure nitrogen vapor and an oxygen-rich liquid.

Condenser E for condensing the nearly pure nitrogen vapor from preliminary rectifier D.

Final rectifier F for rectifying the oxygen-rich liquid from preliminary rectifier D with the nearly pure nitrogen liquid from condenser E as a reflux liquid.

The apparatus shown in Fig. 2 comprises:

Interchanger A for cooling compressed gaseous mixture below atmospheric temperature by returning hydrocarbons separated therefrom.

Preliminary rectifier D for separating the cooled gaseous mixture into a liquid portion containing less volatile hydrocarbons and a vapor portion containing more volatile hydrocarbons.

Condenser and scrubber E for removing the most volatile gases from the vapor portion separated in preliminary rectifier D and for liquefying the remaining vapor portion.

Final rectifier F for rectifying the liquid portion from preliminary rectifier D with liquid from condenser E as a reflux liquid.

Auxiliary rectifier G for separating the less volatile product of the final rectification into more nearly pure gaseous constituents.

The method and apparatus of Fig. 1 will first be described.

Atmospheric air freed of carbon dioxide and possibly of water vapor, enters pipe 1 compressed by compressor H to several hundred pounds pressure. Within interchanger A, the compressed air is cooled to more than 100 degrees below zero centigrade. The cooled compressed air then leaves through pipe 2 and divides, one part flowing through pipe 3 to liquefier B while another part flows through pipe 4 to expansion engine C. By expansion in engine C with performance of external work, the pressure of the air is reduced to 60 or 70 lb. gage and its temperature is reduced by removal of heat therefrom nearly to the saturation temperature at that pressure when the expanded air leaves through pipe 5. Any appreciable amount of superheat in the expanded air is removed by further cooling in coil 6 from which the cooled expanded air leaves through pipe 7 at about the saturation temperature.

The other part of the compressed air which enters liquefier B through pipe 3 is cooled therein and is more or less liquefied when it leaves through pipe 8. This more or less liquefied air is throttled through valve 9 and mixes with the expanded air in pipe 10. The commingled expanded and throttled air enters preliminary rectifier D at an intermediate tray.

Within preliminary rectifier D, the air is separated by rectification upon trays 11 into an oxygen-rich liquid which accumulates at the bottom around coil 6 and nearly pure nitrogen vapor which leaves at the top through pipe 12. The rectification upon trays 11 is produced by reflux vapor and reflux liquid. Reflux vapor is produced by boiling the liquid surrounding coil 6 in cooling the expanded air exhausted from expansion engine C through coil 6. Reflux liquid is produced by condensing a part of the vapor rising from trays 11 as later described. The vapor flowing through pipe 12 to condenser E is condensed therein with the exception of any very highly volatile gases which must be discharged from condenser E by means not shown.

The oxygen-rich liquid is discharged from preliminary rectifier D through pipe 13, throttle valve 14 and pipe 15 into final rectifier F at an intermediate tray. This oxygen-rich liquid is rectified upon trays 16 by the action of reflux liquid and reflux vapor. The reflux liquid is the nearly pure nitrogen liquid discharged from condenser E through pipe 17, throttle valve 18 and pipe 19 onto the topmost tray in final rectifier F. The reflux vapor is produced by vaporization of liquid from trays 16.

This liquid flows through pipe 20 to the vaporizer in condenser E where it is partly vaporized by heat exchange with the nearly pure nitrogen vapor condensed therein. The remaining liquid flows through pipe 21 to the vaporizer in preliminary rectifier D where vaporization is completed by heat exchange with vapor from trays 11 to produce liquid reflux for the preliminary rectification. Part of the vaporized liquid returns through pipe 22 to final rectifier F to form the reflux vapor therein.

The remaining vaporized liquid leaves through pipe 23 as the less volatile product of the final rectification, and thence passes through tubes within liquefier B, through pipe 24, through tubes within interchanger A, and finally leaves through pipe 25 as nearly pure oxygen. Pipe 26 between the vaporizer in preliminary rectifier D and the vaporizer in condenser E serves to convey vaporized liquid in either direction as required.

The more volatile product of the final rectification leaves final rectifier F through pipe 27. This more volatile product flows through coil 28 where it is warmed somewhat in condensing a part of the vapor rising from trays 11 before leaving through pipe 29. The more volatile product of the final rectification thus contributes to the liquid reflux within preliminary rectifier D. The more volatile product of the final rectification returns through tubes within liquefier B, through pipe 30, through tubes within interchanger A and finally leaves through pipe 31 as nearly pure nitrogen.

Coil 28 may be installed in condenser E rather than in preliminary rectifier D. Vapor from preliminary rectifier D would then be liquefied by heat exchange with the more volatile product of the final rectification and the resulting liquid would augment the reflux liquid in the final rectifier rather than the reflux liquid in the preliminary rectifier. In either case, however, the proportions of the heating surfaces in the two vaporizers could be changed with the installation of coil 28 in order to increase the reflux liquids in both the preliminary and the final rectifiers, thus improving the effectiveness of both stages of rectification. Also, coils similar to coil 28 may be installed in both preliminary rectifier D and condenser E in order to increase the reflux liquids in both the preliminary and the final rectifiers without any change in the relative heating surfaces in the two vaporizers. A separate heat exchanger may be used external to both preliminary rectifier D and condenser E for condensing vapor from preliminary rectifier D and warming the more volatile product from final rectifier F. In this case, the liquefied vapor may be discharged into preliminary rectifier D or into condenser E or be divided between them.

The method and apparatus of Fig. 2 will now be described.

A mixture of hydrocarbon gases consisting of say propylene $C_3H_6$, ethylene $C_2H_4$, ethane $C_2H_6$ and methane $CH_4$, and probably containing hydrogen $H_2$ and carbon monoxide $CO$, enters pipe 1 under a high pressure, around one thousand pounds. This process is particularly applicable to a gaseous mixture containing very little propane $C_3H_8$ and other hydrocarbons heavier than propylene. If heavier hydrocarbons should be present, they would be mixed with the propylene separated. In mentioning propylene, therefore, heavier hydrocarbons will be understood to be present as traces or even in appreciable amounts. Any hydrogen and carbon monoxide present will be mixed with the methane separated. Therefore, whenever methane is mentioned, it will be understood to include other highly volatile gases.

The compressed gaseous mixture is cooled within interchanger A by returning products separated therefrom. This interchanger is shown with the gaseous mixture flowing up around tubes therein. In an actual installation, it would be preferable to have the compressed gaseous mixture flow down rather than up so that any liquid formed would flow down with the gaseous mixture. Also, the compressed gaseous mixture should be chemically purified of carbon dioxide and water vapor before entering pipe 1.

The cooled compressed gaseous mixture leaves interchanger A through pipe 2 and thence flows through coil 3, pipe 4, coil 5, pipe 6 and throttle valve 7 into preliminary rectifier D at an intermediate tray. Within preliminary rectifier D, the gaseous mixture is separated into a liquid which contains most of the less volatile constituents and accumulates around coil 5, and a vapor which contains most of the more volatile constituents and leaves through pipe 8. For example, the liquid surrounding coil 5 would contain most of the propylene and ethane and a large portion of the ethylene in the original gaseous mixture mentioned. The vapor which leaves through pipe 8 would contain most of the methane and the remainder of the ethylene in the original gaseous mixture mentioned.

This preliminary rectification is effected upon trays 9 by the action of reflux vapor and reflux liquid. The reflux vapor is produced by heat exchange between the liquid from trays 9 accumulating around coil 5 and the compressed gaseous mixture flowing through coil 5. The reflux liquid is produced in a manner which will be described later.

The vapor which leaves preliminary rectifier D through pipe 8, enters condenser (and scrubber) E at an intermediate tray. In flowing up through trays 10, this vapor is subjected to the scrubbing action of reflux liquid produced by condensing some of the vapor in a manner which will be described later. This reflux liquid flows down from tray to tray and eventually accumulates around coil 3. Reflux vapor is produced by vaporizing some of this liquid by heat exchange with the compressed gaseous mixture flowing through coil 3. The liquid which accumulates around coil 3 is nearly pure ethylene for the gaseous mixture mentioned. The vapor which leaves through pipe 11 is for the gaseous mixture mentioned, methane with very little ethylene commingled therewith. The methane returns through tubes within interchanger A and leaves through pipe 12 as one of the products of the process.

The ethylene-propylene-ethane liquid in preliminary rectifier D is discharged therefrom through pipe 13, throttle valve 14 and pipe 15 into final rectifier F at an intermediate tray. Upon trays 16, this liquid is rectified by means of a reflux liquid and a reflux vapor. The reflux liquid is the nearly pure ethylene liquid discharged from condenser E through pipe 17, throttle valve 18 and pipe 19 onto the topmost tray within final rectifier F. The reflux vapor is produced by vaporization of liquid from trays 16.

This liquid flows through pipe 20 to the vaporizer at the top of preliminary rectifier D where it is partly vaporized by heat exchange with vapor rising from trays 9, thereby producing reflux liquid for the preliminary rectification. The remaining liquid flows through pipe 21 to the vaporizer at the top of condenser E where it is further vaporized by heat exchange with vapor rising from trays 10, thereby producing reflux liquid for scrubbing the methane which leaves through pipe 11. The vapor produced in these two vaporizers returns through pipes 22 and 23 to final rectifier F where it constitutes the reflux vapor.

The remaining liquid is automatically discharged by trap 24 through pipe 25 into auxiliary rectifier G. Trap 24 is indicated as of the ball float type with a valve operated thereby controlling flow of liquid through pipe 25. By means of trap 24, the liquid level is maintained substantially constant in the two vaporizers previously mentioned. No vapor is to be discharged into auxiliary rectifier G through pipe 25.

Within auxiliary rectifier G, the less volatile product of the final rectification, discharged therein as above described, is subjected to rectification upon trays 26 by reflux liquid and reflux vapor. Reflux vapor is produced by vaporization of liquid from trays 26, which flows through pipes 27 and 28 into the two lower vaporizers in condenser E and preliminary rectifier D respectively. Here the liquid is vaporized by heat exchange with vapor within these vessels, thereby contributing to the reflux liquids therein and to the reflux liquid in the final rectifier F. Since these two vaporizers are on the same level, the additional reflux liquids will be distributed between preliminary rectifier D and condenser E in proportion to the numbers and sizes of vertical tubes therein irrespective of the liquid level. The vaporized liquid returns through pipes 29 and 30 to auxiliary rectifier G.

The more volatile product of the final rectification returns from final rectifier F through pipe 31 to coil 32 within auxiliary rectifier G where the more volatile product is warmed in condensing vapor from trays 26, thereby producing reflux liquid within auxiliary rectifier G. This liquid, or its equivalent, eventually reaches the lower vaporizers in condenser E and preliminary rectifier D where it is vaporized in producing reflux liquids therein. The more volatile product of the final rectification thus augments the reflux liquids within condenser E and preliminary rectifier D. It also augments the reflux liquid in final rectifier F since liquid condensed in condenser E serves as reflux liquid in final rectifier F.

The more volatile product of the final rectification, after being warmed somewhat within coil 32, flows through pipe 33, through tubes within interchanger A and finally leaves through pipe 34 as one of the products of the process, nearly pure ethylene with the gaseous mixture mentioned.

As the result of the rectifying action on trays 26 within auxiliary rectifier G, the less volatile product of the final rectification is separated into two products. One of these is more or less pure ethane which leaves the top of auxiliary rectifier G through pipe 35, flows through tubes within interchanger A, and leaves through pipe 36 as one of the products of the process. The other of these products is more or less pure propylene which leaves near the bottom of auxiliary rectifier G through pipe 37, flows through tubes within interchanger A, and leaves through pipe 38.

Preliminary rectifier D and condenser and scrubber E may be interchanged relative to final rectifier F. Also, trap 24 may be connected to draw liquid from the upper vaporizer in either preliminary rectifier D or condenser and scrubber E or even directly from final rectifier F. In any case, trap 24 maintains a constant level of the liquid vaporizing within the two upper vaporizers.

In the operation of either one of these two separation units shown in Fig. 1 and Fig. 2, the liquid levels at the bottoms of vessels D and E are maintained as constant as possible by manual control of valves 14 and 18 respectively. This might be accomplished automatically by means of the device described and claimed in patent application Serial No. 35,825, filed August 12, 1935, now matured into Patent No. 2,062,781, issued December 1, 1936.

The refrigeration supplied by throttling the highly compressed gaseous mixture through valve 7 in Fig. 2 or by expansion of moderately compressed gaseous mixture in expansion engine C in Fig. 1, is automatically brought into balance with the refrigeration required to keep the apparatus at normal operating temperatures below room temperature. This is accomplished by means of controller 42 which operates valve 7 in Fig. 2 or valve 9 in Fig. 1 in accordance with the liquid level in the vaporizers in preliminary rectifier D and condenser E. Tubes 40 and 41 are connected respectively above and below the liquid level. Heat leak to these tubes keeps them filled with gas, so that a differential pressure is conveyed to controller 42 equal to the head of liquid above the point of connection of tube 41 to the shell of the vaporizer.

This automatic refrigeration control as applied to the throttling method of producing refrigeration in Fig. 2, is described and claimed in patent application Serial No. 58,434, filed Jan. 9, 1936, now matured into Patent No. 2,154,668, issued April 18, 1939. Its utilization in connection with the expansion method of producing refrigeration shown in Fig. 1, is claimed herein and will therefore be further described as it may work in one of two ways.

With the liquid levels maintained constant at the bottoms of vessels D and E, any excess or deficiency in refrigeration supplied relative to refrigeration required by the unit, is reflected in a rising or falling liquid level within the vaporizers at the tops of these vessels. For example, should the liquid level in the vaporizers rise, this would indicate an excess of refrigeration supplied. Less external work should be done by expansion of the gaseous mixture in engine C in order to bring the refrigeration supplied into balance with the refrigeration required by the unit. This might be accomplished by opening throttle valve 9 to permit more compressed gas to flow therethrough; for with a constant mass flow of compressed gaseous mixture from compressor H and a constant speed of expansion engine C, any increase in gas flow through throttle valve 9 would result in decreased gas flow through expansion engine C, a lower initial pressure, and less external work done. On the other hand by closing throttle valve 9 somewhat to reduce liquid flow therethrough, liquid would accumulate within liquefier B. This liquid would absorb less heat from the returning products which would therefore return at lower temperatures to interchanger A where they would cool the compressed gaseous mixture to a lower temperature. With constant mass flow from compressor H and constant speed of engine C, the initial pressure would be lowered and less external work done.

Hence, the final result would be a reduction in refrigeration supplied, whether throttle valve 9 were opened wider to increase gas flow or closed somewhat to decrease liquid flow therethrough. The automatic control would therefore operate to maintain a substantial constant liquid level within the vaporizers, whether arranged to open or to close valve 9 with rise in liquid level. Other conditions must of course be such as to provide a proper operating range. Thus, for example, expansion engine C must be capable of supplying the refrigeration required. Controller 42, however, must be damped so that response to variations in liquid level occurs very slowly or at intervals only or the range of valve positions must correspond with a wide variation in liquid level. Otherwise, valve movements will be so erratic that satisfactory control will not be obtained.

In all cases, the valves on the outlet pipes from interchanger A must be adjusted manually or automatically to maintain the flows of products corresponding to the purities desired and the composition of the original gaseous mixture.

Cooling to operating temperatures and defrosting after a period of operation will not be described. Reference may be made to Patent No. 2,154,668, for description of these operations. Application Serial No. 85,120, filed June 13, 1936, now matured into Patent No. 2,180,200, issued November 14, 1939, contains claims on matter shown but not claimed in this application.

I claim:

1. Method of rectifying a gaseous mixture which includes subjecting the gaseous mixture to a preliminary rectification and to a final rectification, and utilizing in vapor form the more volatile product of the final rectification to liquefy vapor from the preliminary rectification.

2. Method of rectifying a gaseous mixture as in claim 1 wherein the liquefied vapor is utilized as a reflux liquid in the rectification.

3. Method of rectifying a gaseous mixture which includes subjecting the gaseous mixture to a preliminary rectification and to a final rectification, producing reflux liquids for the preliminary and final rectifications by heat exchange between vapor from the preliminary rectification and liquid from the final rectification, and augmenting at least one of the reflux liquids by heat exchange between vapor from the preliminary rectification and the more volatile product of the final rectification.

4. Method of rectifying a gaseous mixture which includes subjecting the gaseous mixture to a preliminary rectification and at least a portion thereof to a final rectification, producing reflux vapor in the final rectification and reflux liquid in the preliminary rectification by vaporizing a portion of liquid from the final rectification in condensing vapor from the preliminary rectification, withdrawing the remaining liquid and subjecting it to an auxiliary rectification, producing reflux vapor in the auxiliary rectification and augmenting the reflux liquid in the preliminary rectification by vaporizing liquid from the auxiliary rectification in condensing vapor from the preliminary rectification.

5. Method of rectifying a gaseous mixture as in claim 4 which includes producing reflux liquid in the auxiliary rectification by heat exchange between vapor from the auxiliary rectification and the more volatile product of the final rectification.

6. Method of rectifying atmospheric air containing oxygen, argon and nitrogen which includes subjecting the air to a preliminary rectification whereby it is divided into a nearly pure nitrogen vapor and a liquid containing most of the oxygen and argon and the remaining nitrogen, liquefying the nearly pure nitrogen vapor, subjecting the oxygen-argon-nitrogen liquid to a final rectification with the nearly pure nitrogen liquid as a reflux liquid whereby the air is separated into nearly pure nitrogen vapor and a liquid containing most of the oxygen and argon and little nitrogen, subjecting this liquid to an auxiliary rectification whereby this liquid is separated into more or less pure oxygen and argon, and producing reflux liquid in the auxiliary rectification by warming the nearly pure nitrogen vapor from the final rectification.

7. Method of rectifying a gaseous mixture containing propylene, ethane, ethylene and methane which includes subjecting the gaseous mixture to a preliminary rectification whereby it is separated into a liquid containing most of the propylene and ethane and part of the ethylene and a vapor containing most of the methane and the remainder of the ethylene, partly liquefying said vapor and dividing it into a vapor containing most of the methane and a liquid containing most of the remaining ethylene, subjecting the liquid containing most of the propylene and ethane and part of the ethylene to a final rectification with the liquid containing most of the remaining ethylene as a reflux liquid whereby these liquids are separated into a vapor containing most of the ethylene and a liquid containing most of the propylene and ethane in the original gaseous mixture, and subjecting the liquid containing most of the propylene and ethane to an auxiliary rectification whereby this liquid is separated into propylene-rich and ethane-rich products.

8. Method of rectifying a gaseous mixture as in claim 7 wherein reflux liquid is produced in the auxiliary rectification by warming the vapor containing most of the ethylene from the final rectification.

9. Apparatus for rectifying a compressed gaseous mixture below atmospheric temperature including means for supplying the compressed gaseous mixture at a substantially constant rate of mass flow, a preliminary rectifier, a final rectifier, a vaporizer for vaporizing liquid from said final rectifier by heat exchange with vapor from said preliminary rectifier, an engine for expanding part of the compressed gaseous mixture whereby heat is removed from said gaseous mixture by performance of external work, a valve for throttling the remainder of the compressed gaseous mixture, means for admitting the expanded and the throttled gaseous mixture into said preliminary rectifier, and automatic means for operating said valve in accordance with the liquid level in said vaporizer whereby the expanded part of the compressed gaseous mixture is varied to bring the refrigeration supplied by expansion into balance with the refrigeration required to maintain the apparatus at normal operating temperatures.

10. Apparatus for rectifying a compressed gaseous mixture below atmospheric temperature including means for supplying the compressed gaseous mixture at a substantially constant rate of mass flow, an engine for expanding part of the compressed gaseous mixture whereby heat is removed from said gaseous mixture by performance of external work, a valve for throttling the remainder of the compressed gaseous mixture, a rectifier, means for admitting the expanded and the throttled gaseous mixture into said rectifier, a vessel for liquefied gas accumulating within said rectifier, and automatic means for operating said valve in accordance with the liquid level in said vessel whereby the expanded part of the compressed gaseous mixture is varied to bring the refrigeration supplied by expansion into balance with the refrigeration required to maintain the apparatus at normal operating temperatures.

11. Apparatus for rectifying a gaseous mixture including a preliminary rectifier for separating the gaseous mixture into a liquid component and a vapor component, a condenser for liquefying the vapor component, a final rectifier for separating the liquid component into a liquid product and a vapor product, means for introducing the liquefied vapor component into the final rectifier as a reflux liquid, vaporizers within said preliminary rectifier and said condenser for vaporizing said liquid product in liquefying said vapor component and thereby producing reflux liquids, means for augmenting the reflux liquids by warming the vapor product from said final rectifier and automatic means for maintaining the liquid level substantially constant within said vaporizers whereby the reflux liquids are maintained substantially constant in both the preliminary and the final rectifiers.

12. Apparatus for rectifying a gaseous mixture including a preliminary rectifier for separating the gaseous mixture into a liquid component and a vapor component, a condenser for liquefying the vapor component, a final rectifier for separating the liquid component into a liquid product and a vapor product, means for introducing the liquefied vapor component into the final rectifier as a reflux liquid, means for liquefying vapor from the preliminary rectifier by heat exchange with the vapor product from the final rectifier and means for dividing the liquefied vapor between the preliminary rectifier and the condenser whereby the ratio of liquid refluxes in the preliminary and the final rectifiers is maintained substantially constant.

13. Apparatus for rectifying a gaseous mixture including a preliminary rectifier for separating the gaseous mixture into a liquid component and a vapor component, a condenser for liquefying the vapor component, a final rectifier for separating the liquid component into a liquid product and a vapor product, means for introducing the liquefied vapor component into the final rectifier as a reflux liquid, vaporizers in the preliminary rectifier and the condenser for vaporizing liquid from the final rectifier to serve as reflux vapor therein, an auxiliary rectifier for separating the liquid product into two portions, means for introducing the liquid product from the final rectifier into the auxiliary rectifier, and additional vaporizers in the preliminary rectifier and the condenser for vaporizing liquid from the auxiliary rectifier to serve as reflux vapor therein.

14. Method of rectifying a gaseous mixture which includes subjecting the gaseous mixture to a preliminary rectification and at least a portion thereof to a final rectification, and utilizing the more volatile product of the final rectification to liquefy vapor from the preliminary rectification, wherein the less volatile product of the final rectification serves as intermediary for heat exchange between the vapor from the preliminary rectification and the more volatile product of the final rectification.

15. Method of separating the constituents of a gaseous mixture which includes rectifying the mixture initially in a first rectification zone at a relatively high pressure to produce a liquid fraction and a gaseous fraction, liquefying at least a portion of the gaseous fraction, rectifying said liquid fraction with said liquefied portion at a relatively low pressure in a second rectification zone to produce a liquid component and a gaseous component, transferring heat from the vapor in the first rectification zone to the liquid component to provide a reflux liquid in said first rectification zone, and, in addition, transferring heat from the vapor in the first rectification zone to the gaseous component to augment the quantity of reflux liquid produced in said first rectification zone.

16. Apparatus for rectifying a gaseous mixture including a preliminary rectifier for separating the gaseous mixture into a liquid component and a vapor component, a condenser for liquefying a portion of the vapor component, a final rectifier for separating the liquid component into a liquid product and a vapor product, means for introducing the liquefied portion of the vapor component from said condenser into the final rectifier as a reflux liquid, and means for liquefying another portion of the vapor component from the preliminary rectifier by heat exchange with the vapor product from the final rectifier.

WILLIAM LANE DE BAUFRE.